United States Patent
Lahr et al.

(10) Patent No.: US 11,777,348 B2
(45) Date of Patent: Oct. 3, 2023

(54) ROTOR CORE WITH LOAD BEARING POLYMER AND INSERT

(71) Applicant: GM Global Technology Operations LLC, Detroit, MI (US)

(72) Inventors: Derek Frei Lahr, Howell, MI (US); Alireza Fatemi, Canton, MI (US); Anthony Michael Coppola, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 92 days.

(21) Appl. No.: 17/392,666

(22) Filed: Aug. 3, 2021

(65) Prior Publication Data

US 2023/0045291 A1   Feb. 9, 2023

(51) Int. Cl.
| | |
|---|---|
| *H02K 1/28* | (2006.01) |
| *H02K 1/27* | (2022.01) |
| *H02K 15/12* | (2006.01) |
| *H02K 15/03* | (2006.01) |
| *H02K 1/276* | (2022.01) |

(52) U.S. Cl.
CPC ............. *H02K 1/28* (2013.01); *H02K 1/2766* (2013.01); *H02K 15/03* (2013.01); *H02K 15/12* (2013.01)

(58) Field of Classification Search
CPC ........ H02K 1/28; H02K 1/2766; H02K 15/03; H02K 15/12
See application file for complete search history.

(56) References Cited

U.S. PATENT DOCUMENTS

| | | |
|---|---|---|
| 5,889,342 A | 3/1999 | Hasebe et al. |
| 7,705,503 B2 | 4/2010 | Takahashi et al. |
| 9,030,062 B2 | 5/2015 | Matsumoto |
| 9,041,261 B2 | 5/2015 | Yamamoto et al. |
| 9,806,572 B2 | 10/2017 | Yamagishi et al. |
| 10,116,178 B2 | 10/2018 | Horii et al. |
| 10,574,117 B2 | 2/2020 | Okazaki et al. |
| 11,545,860 B2 | 1/2023 | Lahr et al. |
| 2004/0217666 A1 | 11/2004 | Mellor et al. |
| 2012/0299403 A1 | 11/2012 | Stahlhut et al. |
| 2013/0020889 A1 | 1/2013 | Yamamoto et al. |
| 2013/0026871 A1 | 1/2013 | Dam et al. |
| 2013/0313923 A1 | 11/2013 | Hamer et al. |

(Continued)

FOREIGN PATENT DOCUMENTS

JP 2010193660 A 9/2010

*Primary Examiner* — Thomas Truong
(74) *Attorney, Agent, or Firm* — Vivacqua Crane, PLLC

(57) ABSTRACT

A rotor core for an electric machine of an automobile includes a core stack including a plurality of lamination plates. Each lamination plate includes a plurality of apertures formed therein. The plurality of apertures of each of the lamination plates are axially aligned and define and a slot extending through the core stack and shaped to receive a corresponding insert. The rotor core also includes at least one insert received by the slot that provides radial structural stability to the plurality of lamination plates to prevent portions of the plurality of lamination plates adjacent the plurality of magnet slots from flexing due to radial forces exerted on the plurality of lamination plates during operation of the rotor core. The rotor core includes a load bearing polymer disposed within the aperture of the rotor core that provides contact between and the insert and the lamination plates.

20 Claims, 10 Drawing Sheets

(56) References Cited

U.S. PATENT DOCUMENTS

| | | |
|---|---|---|
| 2013/0334910 A1 | 12/2013 | Takahashi et al. |
| 2014/0028139 A1 | 1/2014 | Hamer et al. |
| 2014/0070637 A1 | 3/2014 | Hamer et al. |
| 2016/0036276 A1 | 2/2016 | Yamagishi et al. |
| 2016/0134163 A1 | 5/2016 | Hamanaka et al. |
| 2016/0181896 A1* | 6/2016 | Masubuchi .......... H02K 1/2766 29/598 |
| 2016/0226326 A1 | 8/2016 | Gotschmann et al. |
| 2016/0261158 A1 | 9/2016 | Horii et al. |
| 2016/0294262 A1* | 10/2016 | Yomoda ................. H02K 15/03 |
| 2017/0155292 A1 | 6/2017 | Kimura et al. |
| 2018/0375395 A1 | 12/2018 | Yamagishi |
| 2019/0238017 A1 | 8/2019 | Ohira |
| 2022/0294293 A1 | 9/2022 | Yang et al. |
| 2022/0337111 A1 | 10/2022 | Lahr et al. |

\* cited by examiner

ROTOR CORE WITH LOAD BEARING POLYMER AND INSERT

INTRODUCTION

The present disclosure relates to a rotor core for an electric machine within an automobile. More specifically, the present disclosure relates to a rotor core having a plurality of lamination plates, at least one insert that provides radial structure stability to the lamination plates, and a load bearing polymer that provides contact between the insert and the rotor core. The present disclosure also relates to a method for assembling the rotor core.

An electric machine such as an interior permanent magnet machine or a synchronous machine includes a rotor assembly having a rotor core with magnets of alternating polarity spaced around the rotor core. Some rotor cores define slots that act as barrier layers for magnetic fields. Some of the slots may contain the magnets.

Stress levels in a rotor core due to centrifugal force are often highest at a web or at a bridge of the rotor core. Increasing the thickness of the web or bridge or increasing the arc radius of the slot that partially defines the web or bridge may reduce such stress, but not without a torque reduction due to increased flux leakage. Selective heat treatment of portions of stainless steel lamination plates that form the rotor core may provide additional strength without the corresponding torque reduction due to flux leakage and a reduction in permeability. This translates to an increase in torque, or strength through an increase in cross section with no penalty in torque/flux leakage, because they are now impermeable. However, this approach may add significant cost to the rotor.

In another approach, an insert constructed from a non-magnetic material is employed to provide radial structural stability to a plurality of lamination plates that are part of a core stack of the rotor core. In this approach, the lamination plates define a groups of magnet slots that may be arranged symmetrically around the core stack, where each magnet slot receives a permanent magnet therein, and an insert is provided for each group of magnet slots. The insert may prevent portions of the lamination plates located adjacent to the magnet slots from flexing due to radial forces exerted upon the lamination plates during operation of the rotor core. However, the insert requires two seemingly contradictory features, which are clearance between the insert and the lamination plates to allow for low cost manufacturing and assembly, and also contact between the insert and the lamination plates to effectively transmit loads.

Thus, while current rotor cores achieve their intended purpose, there is a need in the art for an improved rotor core including at least one insert that provides radial structural stability, where the rotor core is relatively easy and inexpensive to manufacture and assemble.

SUMMARY

According to several aspects, a rotor core for an electric machine is disclosed, and includes a core stack including a plurality of lamination plates. Each lamination plate includes a plurality of apertures formed therein. The plurality of apertures of each of the lamination plates are axially aligned and each define a plurality of axial magnet slots extending through the core stack shaped to receive a corresponding permanent magnet insert therein and a slot extending through the core stack and shaped to receive a corresponding insert. The rotor core also include least one insert received by the slot of the rotor core that provides radial structural stability to the plurality of lamination plates to prevent portions of the plurality of lamination plates adjacent the plurality of axial magnet slots from flexing due to radial forces exerted on the plurality of lamination plates during operation of the rotor core. The rotor core also includes a load bearing polymer disposed within the aperture of the rotor core, where the load bearing polymer provides contact between and the insert and the lamination plates.

In another aspect, the load bearing polymer is either a thermoplastic or a thermoset polymer.

In one aspect, the at least one insert includes a first distal end and a second distal end, where the first distal end of the insert is disposed adjacent to an outer diameter of the core stack and the second distal end of the insert is disposed adjacent to an inner diameter of the core stack.

In another aspect, the first distal end of the insert includes a flange, and a portion of the flange is in direct contact with the lamination plates of the rotor core.

In still another aspect, the flange includes a straight surface and two angled surfaces, and only the two angled surfaces of the flange of the insert directly contact the lamination plates of the rotor core.

In yet another aspect, the first distal end of the insert includes a flange, and a portion of the flange is in direct contact with the load bearing polymer.

In one aspect, a portion of the second distal end of the insert directly contacts the load bearing polymer.

In still another aspect, the second distal end of the insert includes a flange having a straight surface and two angled surfaces, and only the two angled surfaces of the flange of the insert directly contact the load bearing polymer.

In yet another aspect, the second distal end of the insert includes a flange, and a portion of the flange directly contacts the load bearing polymer.

In one aspect, the insert includes a pair of outward projecting nubs disposed on opposing sides of the insert in a location directly above a middle flux guide of the rotor core.

In still another aspect, a portion of each of the pair of outward projecting nubs directly contact a portion of the load bearing polymer, and the portion of the load bearing polymer that directly contacts the pair of outward projecting nubs restricts motion of the middle flux guide of the rotor core.

In yet another aspect, the insert includes a pair of hooked tabs disposed on opposing sides of the insert.

In one aspect, each of the pair of hooked tabs of the insert directly contact and engage with a portion of a middle flux guide of the rotor core.

In still another aspect, the insert includes a first pair of hooked tabs and a second pair of hooked tabs disposed on opposing sides of the insert.

In yet another aspect, each of the first pair of hooked tabs engage with and directly contact the load bearing polymer, where the load bearing polymer is disposed along an end surface defined by an outer flux guide of the rotor core.

In one aspect, each of the second pair of hooked tabs engage with directly contact the load bearing polymer, where the load bearing polymer is disposed along an outer surface defined by a middle flux guide of the rotor core.

In another aspect, the rotor core defines an inner flux guide, a middle flux guide, and an outer flux guide.

In still another aspect, the middle flux guide defines a first retention tab that projects inwardly towards the inner flux guide, and the outer flux guide defines a second retention tab that projects outwardly towards the middle flux guide.

In yet another aspect, the load bearing polymer is disposed between the first retention tab and a magnetic insert.

In one aspect, a method of assembling a rotor core is disclosed, and includes creating a temperature differential is between the rotor core and at least one insert. The method includes receiving the at least one insert by a slot of the rotor core. The temperature differential results in an interference fit between a first distal end and a second distal end of the at least one insert and the slot of the rotor core. The method also includes placing the rotor core within a mold tool, wherein the mold tool includes a plurality of rams. The method also includes exerting, by the plurality of rams, a radial pressure against an outer diameter of the rotor core. Finally, the method includes injecting a load bearing polymer into clearance features within the rotor core as the plurality of rams exert the radial pressure against the outer diameter of the rotor core.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
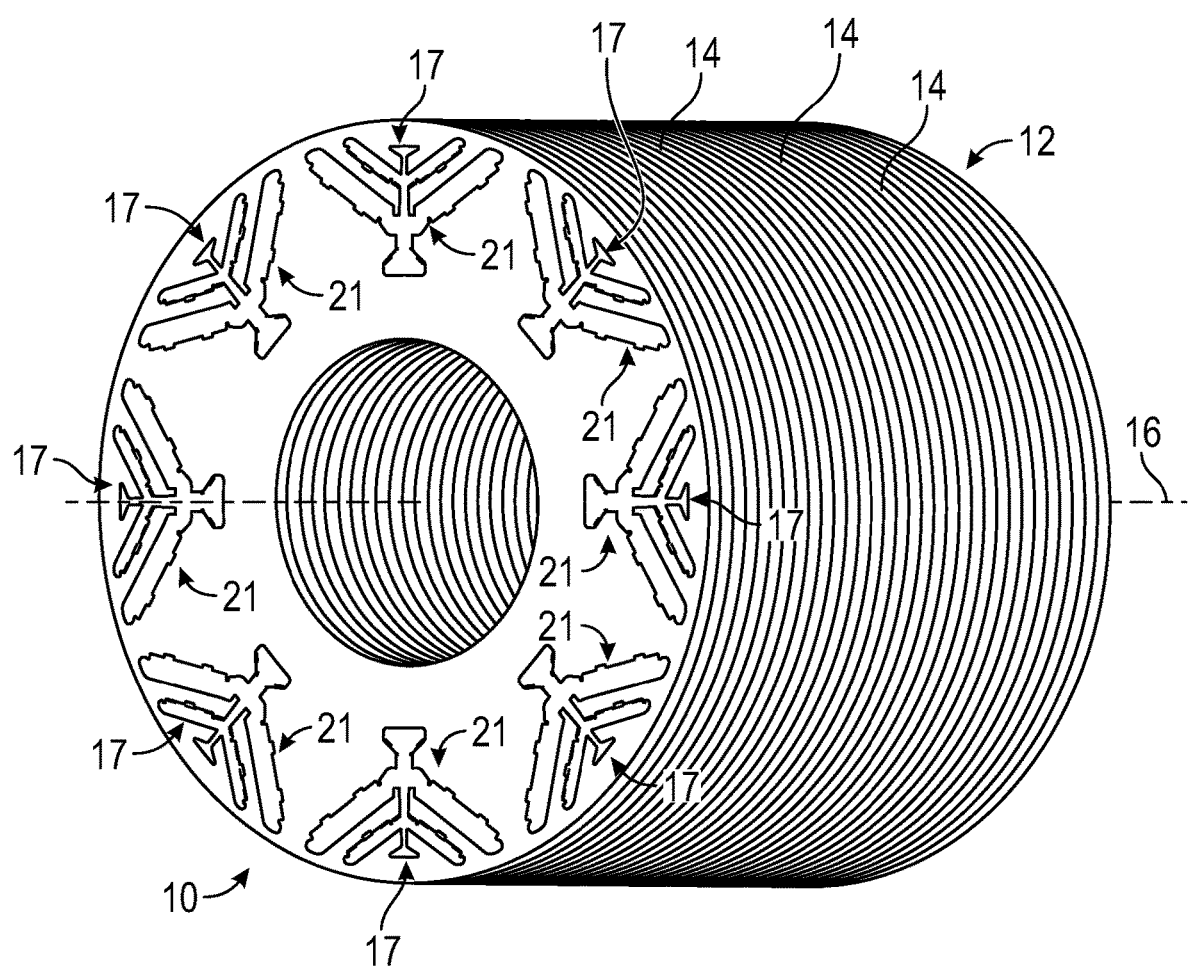
FIG. 1 is a perspective view of a core stack of a rotor core according to an exemplary embodiment of the present disclosure.

Referring to FIG. 1, a rotor core 10 for an electric machine is illustrated. The rotor core 10 includes a core stack 12 having a plurality of identical lamination plates 14. In an embodiment, the electric machine including the rotor core 10 is part of an automobile. For example, the rotor core 10 may be part of a starter, an alternator, or a starter/generator of an automobile. Each of the lamination plates 14 is manufactured from a ferrous material such as, but not limited to, steel or non-orientated electrical steel. The lamination plates 14 are disposed adjacent each other along a central axis 16 to define the core stack 12. Each of the lamination plates 14 includes a plurality of apertures 17 formed therein. Referring to both FIGS. 1 and 2, the lamination plates 14 are aligned along the central axis 16 relative to one another such that the apertures 17 of each of the lamination plates 14 are axially aligned with the corresponding apertures 17 in adjacent lamination plates 14 to define a plurality of axial magnet slots 18, a slot 20, and a plurality of clearance features 22 (the clearance features are shown in dashed line in FIG. 2).

Figure 2:
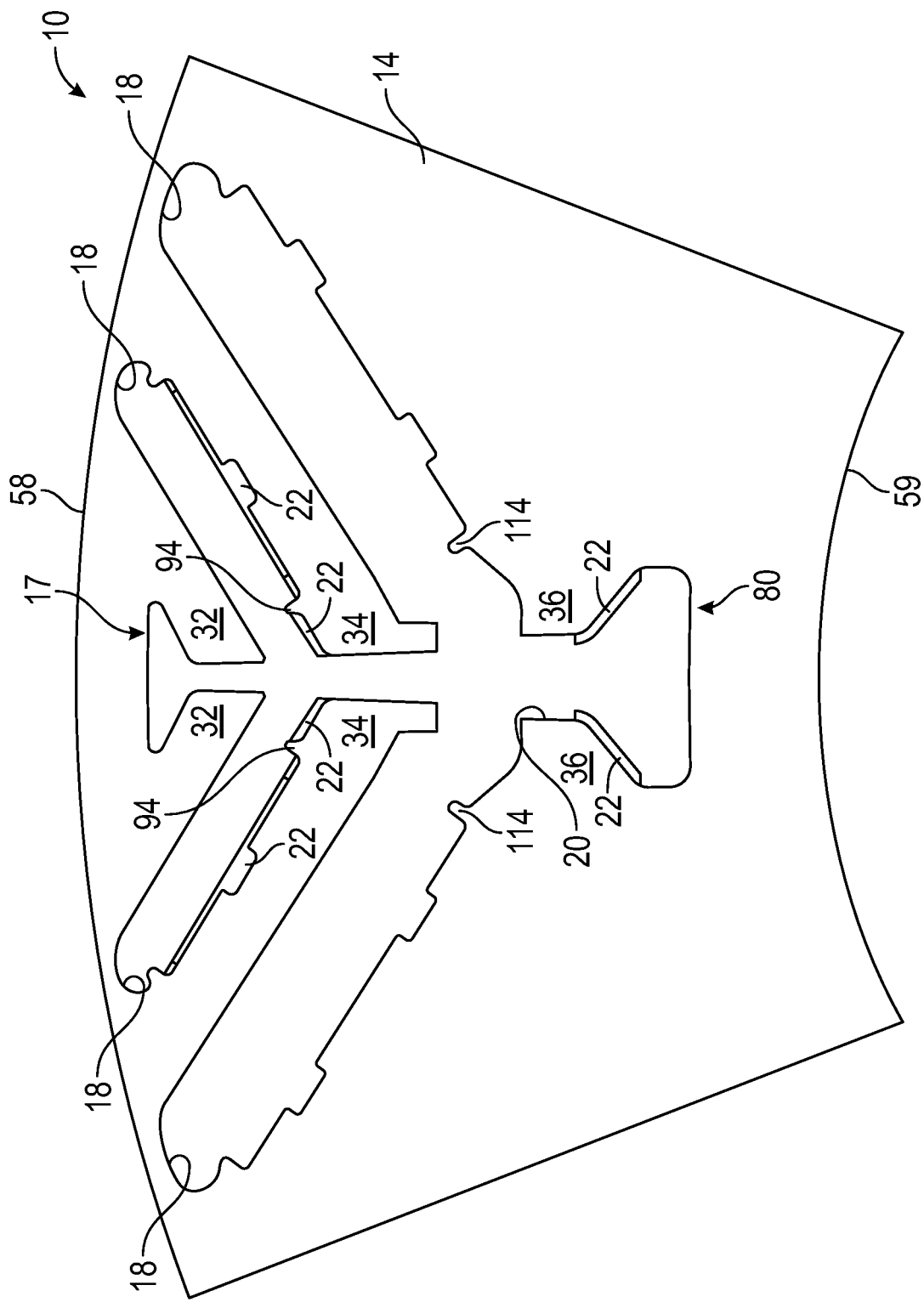
FIG. 2 is a front view of a single aperture that is part of the core stack shown in FIG. 1 according to an exemplary embodiment of the present disclosure.

Continuing to refer to FIGS. 1 and 2, the magnet slots 18, the slot 20, and the clearance features 22 of each aperture 17 extend axially through the core stack 12 parallel to the central axis 16. The magnet slots 18 are each shaped to receive a corresponding permanent magnet insert 40 (seen in FIG. 3) therein. The slot 20 of each aperture 17 extends axially through the core stack 12 parallel to the central axis 16 and is shaped to receive a corresponding insert 42 (seen in FIG. 3), where the rotor core 10 includes at least one insert 42. The clearance features 22 of each aperture 17 also extend axially through the core stack 12 in a direction parallel to the central axis 16. The clearance features 22 provide clearances during assembly as the magnetic inserts 40 are inserted into the corresponding magnet slots 18 and the insert 42 is inserted into the corresponding slot 20. As explained below, once the magnetic inserts 40 and the insert 42 are assembled to the rotor core 10, a load bearing polymer 44 (seen in FIG. 3) may then fill least a portion of the clearance features 22. As explained below, the load bearing polymer 44 is disposed within the aperture 17 of the rotor core 10 to provide contact between the magnetic inserts 40 and the lamination plates 14 as well as between and the insert 42 and the lamination plates 14.

In an embodiment, the load bearing polymer 44 is either a thermoplastic or a thermoset polymer. Some examples of thermoplastic polymers that are used as the load bearing polymer 44 include, but are not limited to, polyamides, polyamideimide, polyimide (thermoplastic version), polyether ether ketone (PEEK), polyphenylene sulfide (PPS), polyphthalamide (PPA), polyolefins, polypropylene, acrylonitrile butadiene styrene (ABS), polycarbonates (PC), polyvinyl chloride (PVC), and polyethylene. Some examples of thermoset polymers that are used as the load bearing polymer 44 include, but are not limited to, epoxy, phenolic, bismaleimide, benzoxazine, polyurethane, polyester, and polyimide. In an embodiment, the load bearing polymer 44 may further include a reinforcement material, however, it is to be appreciated that the reinforcement material is optional. The reinforcement material may be fibrous or particulate. Some examples of fibrous reinforcement materials include, but are not limited to, basalt and carbon fiber. Some examples of particulate reinforcement material include, but are not limited to, calcium carbonate/carbonite, mica, silicates, calcium sulphate, calcium metasilicate, clay, hydrous magnesium silicates, silica, alumina, aluminum nitride, silicon nitride, and boron nitride In one non-limiting embodiment, the load bearing polymer 44 includes a tensile strength of at least about forty Megapascals, and in one specific embodiment at least about sixty Megapascals. In one exemplary embodiment, the load bearing polymer 44 includes a compression strength of at least about seventy five Megapascals, and in one specific embodiment at least about one hundred and fifty Megapascals. In an embodiment, the load bearing polymer 44 includes a glass transition temperature of about 120° C., and in one specific embodiment about 150° C. In one exemplary embodiment, the load bearing polymer 44 includes a density of about 5,000 kilograms/meter$^3$, and in one specific embodiment about 5,000 kilograms/meter$^3$. In one exemplary embodiment, the load bearing polymer 44 is non-magnetic. In an embodiment, the load bearing polymer 44 is also not electrically conductive. In another embodiment, the load bearing polymer 44 may generate non-corrosive byproducts.

In the embodiment as shown in FIG. 1, the core stack 12 includes eight symmetrical groups 21 of magnet slots 18. However, it is to be appreciated that FIG. 1 is merely exemplary in nature, and the core stack 12 is not limited to eight groups 21 of magnet slots 18. FIGS. 1 and 2 illustrate each group 21 including four magnet slots 18 oriented in a V-shape configuration. Referring specifically to FIG. 2, the magnet slots 18 of each group 21 further define outer flux guides 32, middle flux guides 34 and inner flux guides 36. The outer flux guides 32 are disposed adjacent to an outer diameter 58 of the core stack 12, the inner flux guides 32 are disposed adjacent to an inner diameter 59 of the core stack 12, and the middle flux guides 34 are disposed between the outer flux guides 32 and the inner flux guides 36. The outer flux guide, the middle flux guide, and the inner flux guide 32, 34, 36 provide a path for electrical flux currents during operation of the rotor core 10.

Figure 3:
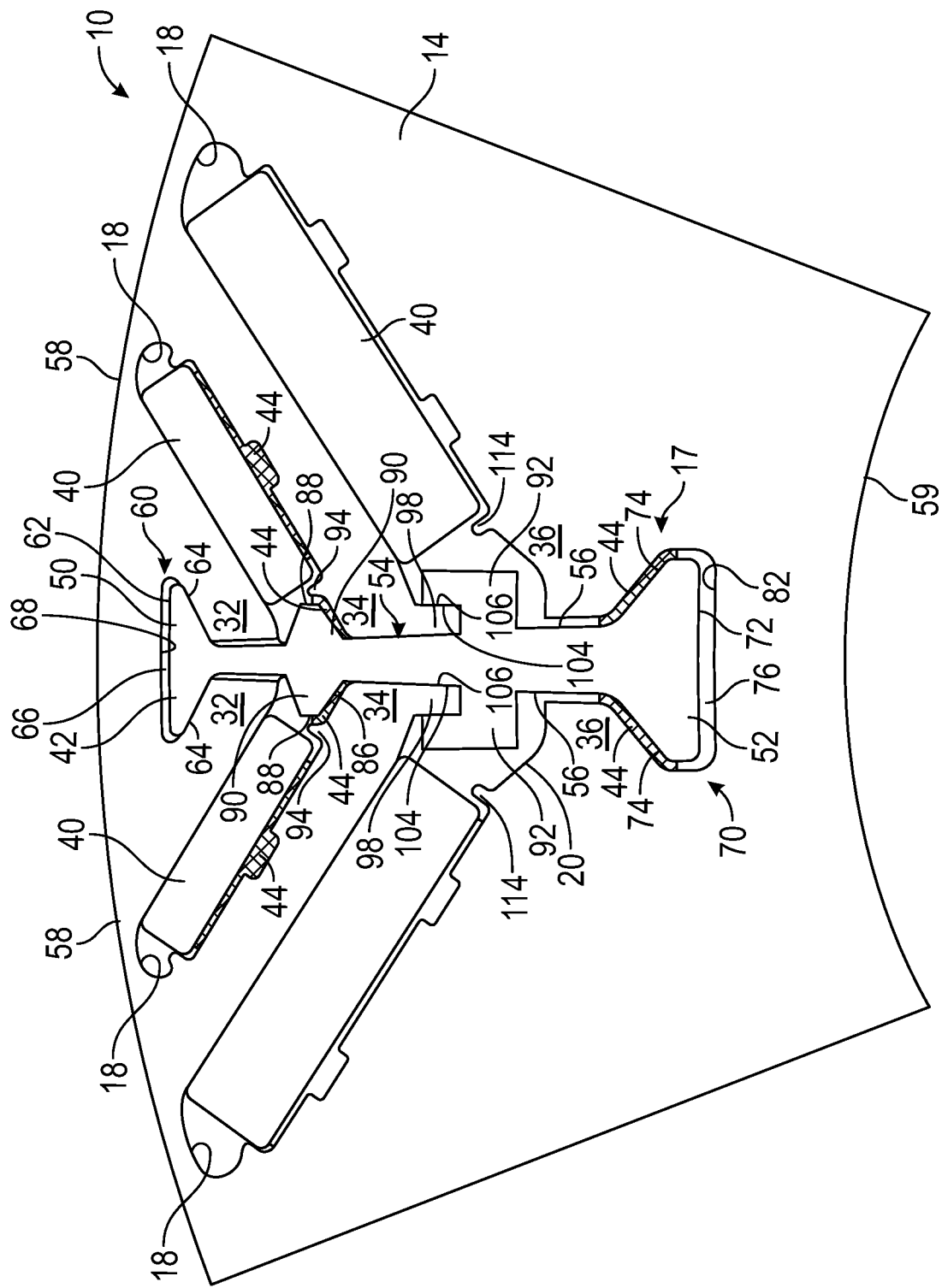
FIG. 3 is a front view of the aperture shown in FIG. 2, where a plurality of magnetic inserts, a radial insert, and a load-bearing polymer are included according to an exemplary embodiment of the present disclosure.

Referring to FIGS. 2 and 3, the slot 20 of the aperture 17 is shaped to receive the insert 42. The rotor core 10 includes at least one insert 42 configured to provide radial structural stability to the plurality of lamination plates 14 to prevent portions of the plurality of lamination plates 14 adjacent the plurality of magnet slots 18 from flexing due to radial forces exerted on the plurality of lamination plates 14 during operation of the rotor core 10. More specifically, an insert 42 is associated with each of the groups 21 of magnet slots 18 of the rotor core 10. The insert 42 is configured to provide support to the outer flux guides 32, the middle flux guides 34, and the inner flux guides 36 of the rotor core 10 to prevent the outer flux guides 32, the middle flux guides 34, and the inner flux guides 36 from flexing outward due to centrifugal forces as the rotor core 10 spins during operation.

In one embodiment, each insert 42 is constructed entirely from an austenitic or non-magnetic material. It is to be appreciated that when a ferrous or magnetic material interconnects two poles of a magnet there is a loss of efficiency in the flux currents within the rotor core 10. Since the insert 42 is constructed entirely from a non-magnetic material, such efficiency losses may be prevented and the rotor core 10 may be designed with smaller magnets to result in reduced costs, and the insert 42 may be made larger. In another exemplary embodiment, each of the inserts 42 are constructed entirely from a high strength ferrous material. In this embodiment, the rotor core 10 may spin at higher speeds with no increase in magnetic flux leakage.

Figure 4:
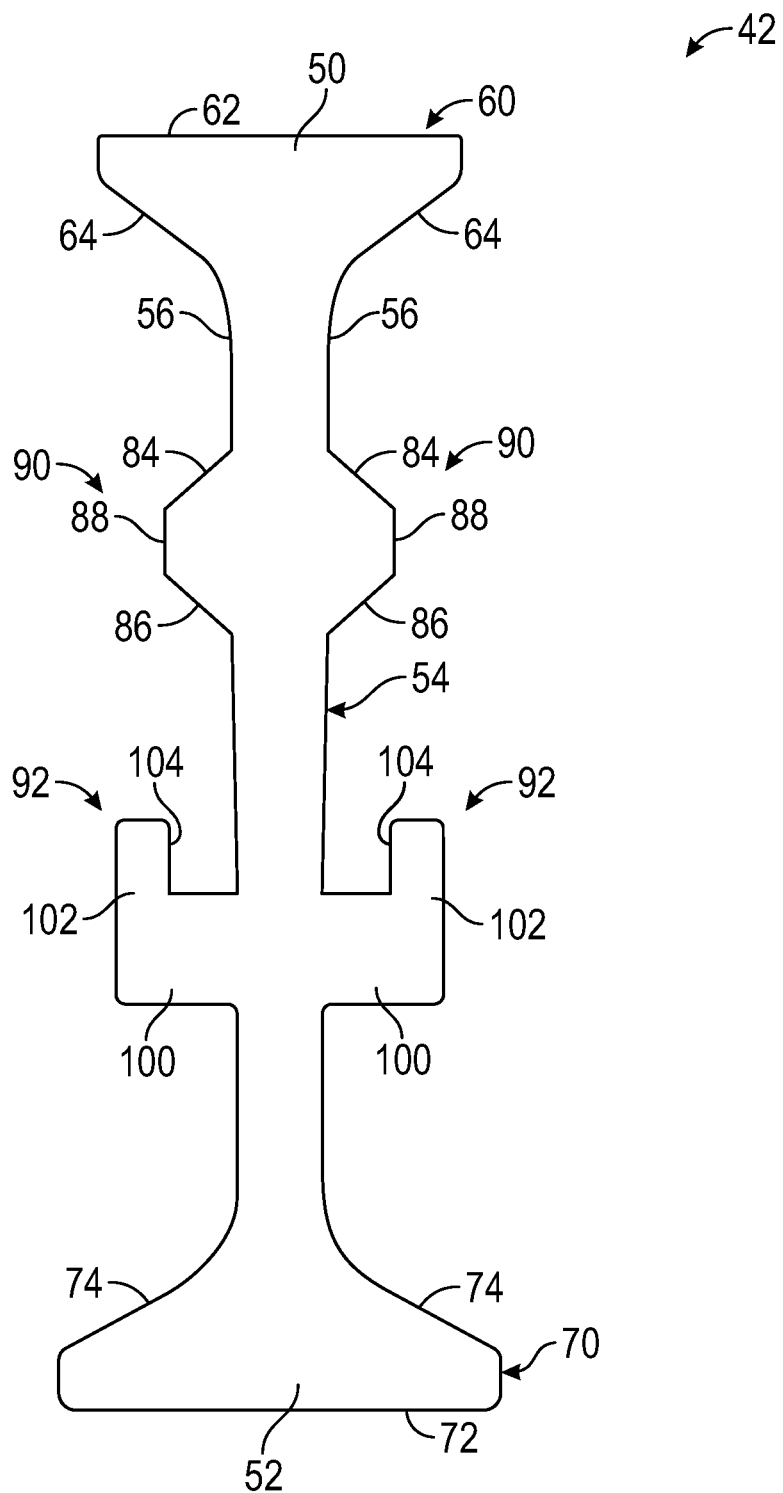
FIG. 4 is an illustration of the insert shown in FIG. 3 according to an exemplary embodiment of the present disclosure.

Each of the inserts 42 include one or more features that are configured to engage with portions of the rotor core 10. In the exemplary embodiment as shown in FIGS. 3 and 4, the insert 42 includes a first distal end 50, a second distal end 52, a body portion 54 that extends between the first distal end 50 and the second distal end 52, and a pair of opposing sides 56. Referring specifically to FIG. 3, the first distal end 50 of the insert 42 is disposed adjacent to the outer diameter 58 of the core stack 12, and the second distal end 52 of the insert 42 is disposed adjacent to the inner diameter 59 of the core stack 12. The insert 42 also includes a pair of outward projecting nubs 90 that are disposed on the opposing sides 56 of the insert 42 in a location directly above the middle flux guide 34 of the rotor core 10. The insert 42 also includes a pair of hooked tabs 92 that are disposed on the opposing sides 56 of the insert 42.

Continuing to refer to FIGS. 3 and 4, the first distal end 50 of the insert 42 includes a flange 60, where a portion of the flange 60 is in direct contact with the lamination plates 14 of the rotor core 10. Specifically, the flange 60 includes a straight surface 62 and two angled surfaces 64. Only the two angled surfaces 64 of the flange 60 of the insert 42 directly contact the lamination plates 14 of the rotor core 10. In other words, the two angled surfaces 64 of the flange 60 of the insert 42 are in metal-to-metal contact with the rotor core 10. In contrast, the straight surface 62 of the flange 60 of the insert 42 does not contact the lamination plates 14 of the rotor core 10. Instead, a clearance 66 is located between the straight surface 62 of the flange 60 and an uppermost surface 68 of the slot 20. The clearance 66 allows for easy assembly of the insert 42 into the corresponding slot 20.

As seen in FIG. 3, a portion of the second distal end 52 of the insert 42 directly contacts the load bearing polymer 44. Specifically, the second distal end 52 of the insert 42 includes a flange 70 having a straight surface 72 and two angled surfaces 74. The two angled surfaces 74 and the straight surface 72 of the flange 60 of the insert 42 do not make direct contact with the lamination plates 14 of the rotor core 10. However, only the two angled surfaces 74 of the flange 60 of the insert 42 directly contact the load bearing polymer 44. During assembly, the clearance features 22 located at a distal end 80 of the slot 20 (seen in FIG. 2) act as a tolerancing device to provide ease of assembly when assembling the insert 42 into the corresponding slot 20. Referring to both FIGS. 2 and 3, the clearance features 22 are then filled with the load bearing polymer 44. As seen in FIG. 3, the straight surface 72 of the flange 70 of the insert 42 does not contact the lamination plates 14 of the rotor core 10, and instead a clearance 76 is located between the straight surface 72 of the flange 60 and a lowermost surface 82 of the slot 20.

Referring specifically to FIG. 4, a portion of each of the pair of outward projecting nubs 90 directly contact a portion of the load bearing polymer 44. Specifically, each outward projection nub 90 defines a pair of angled surfaces 84, 86 connected to one another by a straight surface 88. An upper angled surface 84 is positioned adjacent to the first distal end 50 of the insert 42, and a lower angled surface 86 is disposed adjacent to the hooked tabs 92 of the insert 42. As seen in FIG. 3, the angled surfaces 84, 86 and the straight surface 88 of each of the outward projecting nubs 90 do not make direct contact with the lamination plates 14 of the rotor core 10. The lower angled surface 86 and a portion of the straight surface 88 of each of the outward projecting nubs 90 of the insert 42 directly contact the load bearing polymer 44. Specifically, during assembly, the clearance features 22 (FIG. 2) located between the middle flux guide 34 and a flux guide nub 94 of the aperture 17 act as a tolerancing device to provide ease of assembly with inserting the insert 42 into the corresponding slot 20. Referring to both FIGS. 2 and 3, the clearance features 22 disposed between the middle flux guide 34 and the flux guide nub 94 are then filled with the load bearing polymer 44.

Referring to FIGS. 3 and 4, the hooked tabs 92 of the insert 42 directly contact and engage with a portion of the middle flux guide 34 of the rotor core 10. Referring to FIG. 4, the hooked tabs 92 each include an outward extending portion 100 and an upward extending shelf 102. The upward extending shelf 102 defines an inner surface 104. Referring to FIGS. 3 and 4, the inner surface 104 of the upward extending shelf 102 of each hooked tab 92 directly contacts a surface 106 of the shelf 98 of the middle flux guide 34. In other words, the pair of hooked tabs 92 of the insert 42 make metal-to-metal contact with contact with the rotor core 10. The engagement between the hooked tab 92 of the insert 42 and the respective shelf 98 of the middle flux guide 34 provides structural stability and prevents the middle flux guide 34 from flexing outward due to centrifugal forces as the rotor core 10 spins during operation.

Figure 5:
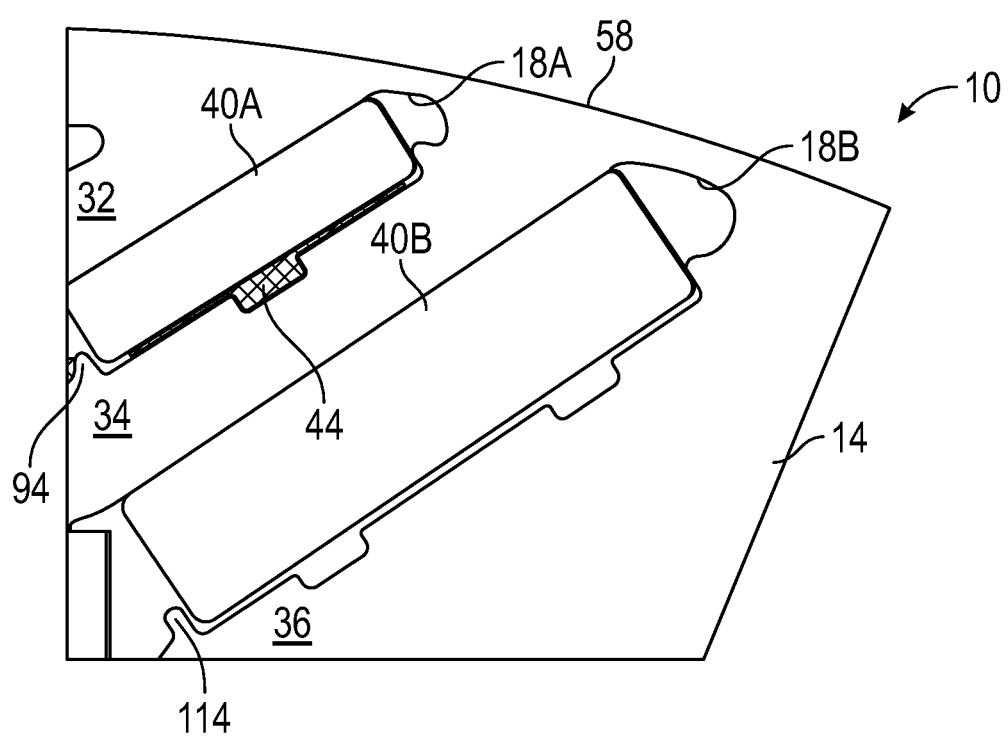
FIG. 5 is an enlarged view of a portion of the rotor core shown in FIG. 3 according to an exemplary embodiment of the present disclosure.

FIG. 5 is an enlarged view of the outer flux guide 32, the middle flux guide 34, the inner flux guide 36, and the magnet inserts 40. A first magnetic insert 40A is disposed between the outer flux guide 32 and the middle flux guide 34, and a second magnetic insert 40B is located between the middle flux guide 34 and the inner flux guide 36. The flux guide nub 94 is disposed within the first magnet slot 18A and retains the first magnet insert 40A in place within the rotor core 10. Similarly, a flux guide nub 114 is also disposed within the second magnet slot 18B of the rotor core 10 and retains the second magnet insert 40B in place within the rotor core 10. Referring to both FIGS. 2 and 5, the clearance feature 22 located between the first magnet slot 18A and the middle flux guide 34 is filled with the load bearing polymer 44 during assembly. There is a tendency for the middle flux guide 34 to move radially outward towards the first magnetic insert 40A, especially if there is any clearance between the middle flux guide 34 and the first magnetic insert 40A. The load bearing polymer 44 takes up the clearance between the middle flux guide 34 and the first magnetic insert 40A, and resists movement of the middle flux guide 34. Instead, the load bearing polymer 44 reacts the centrifugal force onto the outer flux guide 32.

Figure 6:
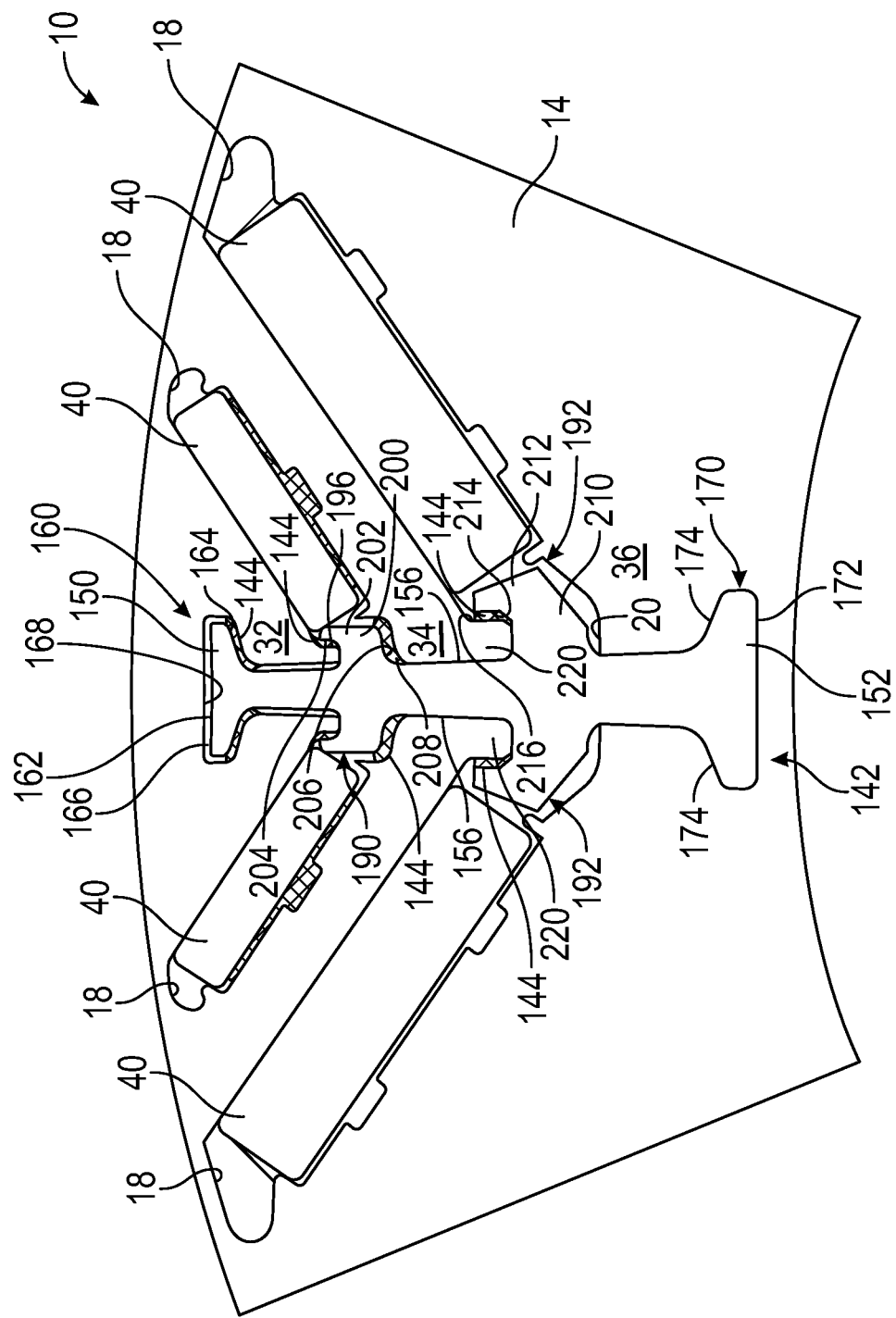
FIG. 6 is an alternative embodiment of the insert installed in the rotor core according to an exemplary embodiment of the present disclosure.

FIG. 6 is an alternative embodiment of an insert 142 as part of the rotor core 10. In the embodiment as shown in FIG. 6, a first distal end 150 of the insert 142 is in direct contact with a load bearing polymer 144, which in turn increases the stiffness of the outer flux guide 32. Specifically, the first distal end 150 of the insert 142 includes a flange 160 having a straight surface 162 and two angled surfaces 164. The two angled surfaces 164 of the first distal end 150 of the insert 142 do not make direct contact with the lamination plates 14 of the rotor core 10. Instead, the two angled surfaces 164 of the flange 160 of the insert 142 directly contact the load bearing polymer 144. A clearance 166 is located between the straight surface 162 of the flange 160 and an uppermost surface 168 of the slot 20.

Continuing to refer to FIG. 6, the second distal end 152 of the insert 142 includes a flange 170, where a portion of the flange 170 directly contacts the load bearing polymer 144. Specifically, the flange 170 includes a straight surface 172 and two angled surfaces 174. The two angled surfaces 174 and the straight surface 172 of the flange 170 of the insert 142 contact the lamination plates 14 of the rotor core 10. In other words, the second distal end 152 of the flange 170 makes metal-to-metal contact with the rotor core 10.

The insert 142 further includes a first pair of hooked tabs 190 and a second pair of hooked tabs 192 that are disposed on opposing sides 156 of the insert 142. Each of the first pair of hooked tabs 190 define an upwardly extending shelf 202 that engages with a load bearing polymer 144 disposed along an end surface 196 defined by the outer flux guide 32. Specifically, the first pair of hooked tabs 190 each include an outward extending portion 200 and the upward extending shelf 202. The upward extending shelf 202 defines an inner surface 204. The inner surface 204 of the upward extending shelf 202 of each of the first pair of hooked tabs 190 directly contacts the load bearing polymer 144. The first pair of hooked tabs 190 each include a bottom surface 206 defined by the outward extending portion 200. The bottom surface 206 of each first pair of hooked tab 190 engages with a load bearing polymer 144 disposed along a portion of an upper surface 208 defined by the middle flux guide 34.

The second pair of hooked tabs 192 each include an outward extending portion 210 and the upward extending shelf 212. The upward extending shelf 212 defines an inner surface 214. The inner surface 214 of the upward extending shelf 212 of each of the second pair of hooked tabs 192 directly contact a load bearing polymer 144 disposed along an outer surface 216 of a shelf 220 defined by the middle flux guide 34. The engagement between the second pair of hooked tabs 192 of the insert 142 and the respective shelf 220 of the middle flux guide 34 provides structural stability and prevents the middle flux guide 34 from flexing outward due to centrifugal forces as the rotor core 10 spins during operation.

Figure 7:
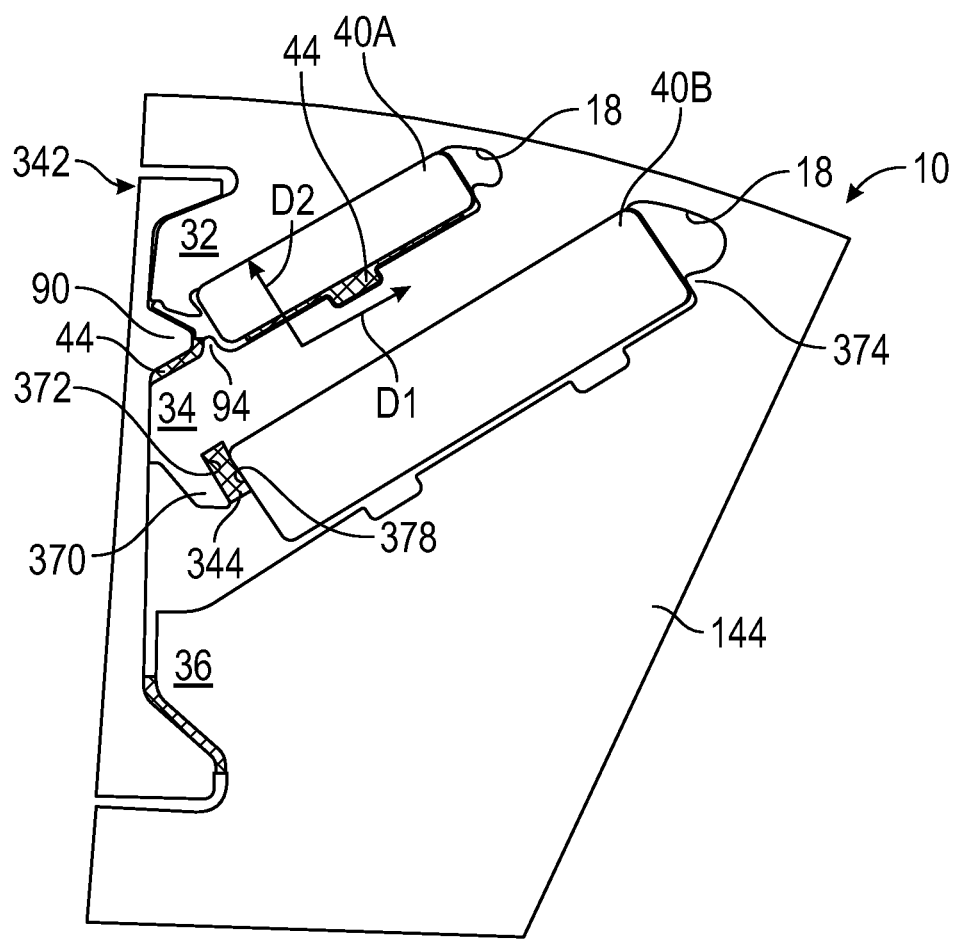
FIG. 7 is yet another embodiment of the insert installed in the rotor core according to an exemplary embodiment of the present disclosure.

FIG. 7 is an alternative embodiment of an insert 342 as part of the rotor core 10. In the embodiment as shown in FIG. 7, the pair of hooked tabs 92 (shown in FIG. 3) disposed on the opposing sides 56 of the insert 42 have been omitted. The middle flux guide 34 defines a first retention tab 370 that projects inwardly towards the inner flux guide 36, and the outer flux guide 36 defines a second retention tab 374 that projects outwardly towards the middle flux guide 34. The first retention tab 370 defines a side surface 372. A load bearing polymer 344 is disposed between the side surface 372 of the first retention tab 370 and a side surface 378 of the second magnetic insert 40B. The second magnetic insert 40B magnet resists the motion of the middle flux guide 34, as the middle flux guide 34 wants to slip/shear between the magnetic inserts 40A, 40B. Referring to both FIGS. 3 and 7, the flux guide nub 114 disposed within the second magnet slot 18B of the rotor core 10 (seen in FIG. 3) may be eliminated, since the first retention tab 370 and the second retention tab 374 hold the second magnetic insert 40B in place. The middle flux guide 34 is constrained in two orthogonal directions, namely a first direction D1 and a second direction D2, where the first direction D1 is aligned with the magnetic inserts 40A, 40B. The insert 42 restricts motion of the middle flux guide 34 in the first direction D1 via the portion of the load bearing polymer 44 contacting the pair of outward projecting nubs 90. The second magnetic insert 40B located between the middle flux guide 34 and the inner flux guide 36 may be used to restrict motion in the second direction D2 via the first retention tab 370 and the load bearing polymer 344.

Figure 8:
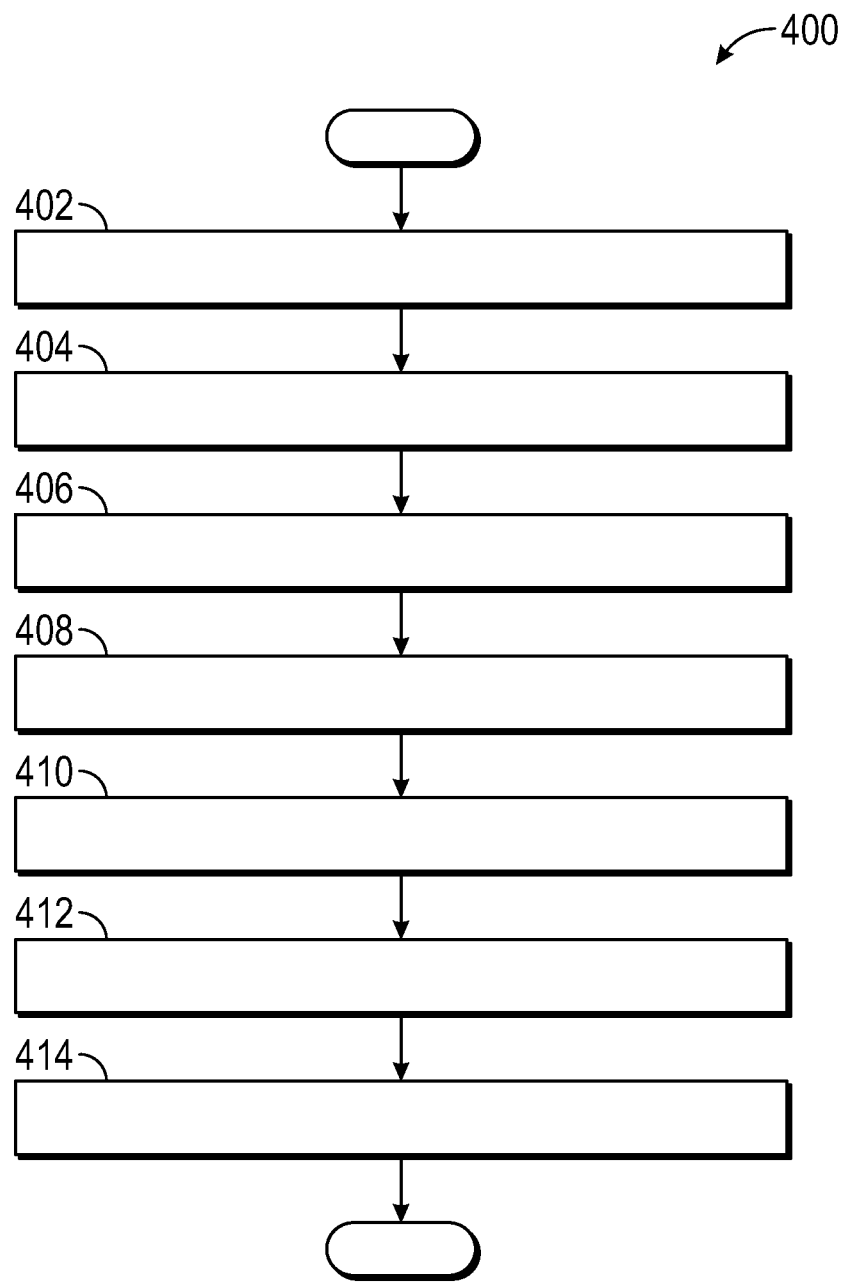
FIG. 8 is a process flow diagram illustrating a method of assembling the rotor core according to an exemplary embodiment of the present disclosure.
Figure 9:
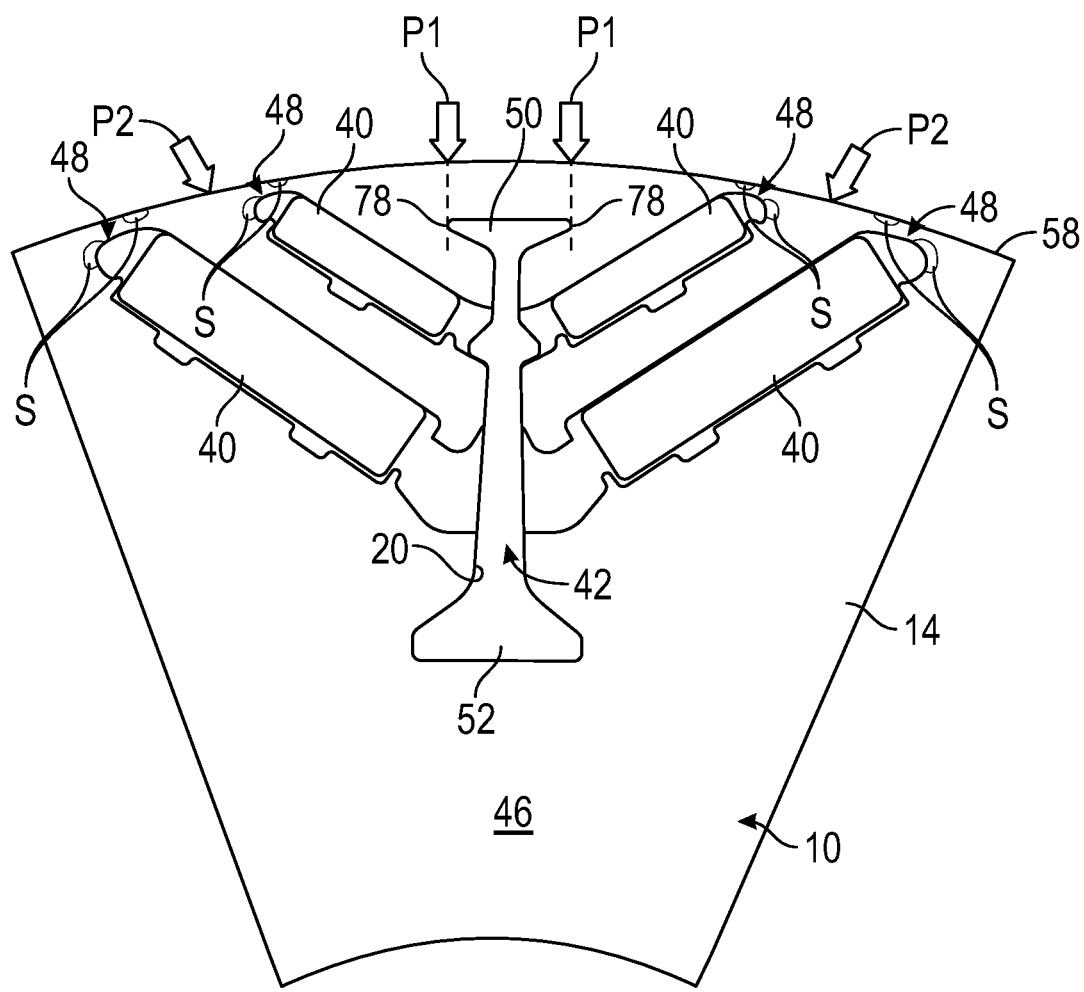
FIG. 9 is an illustration of the magnetic inserts and the insert assembled into the rotor core prior to injecting the load bearing polymer according to an exemplary embodiment of the present disclosure.
Figure 10:
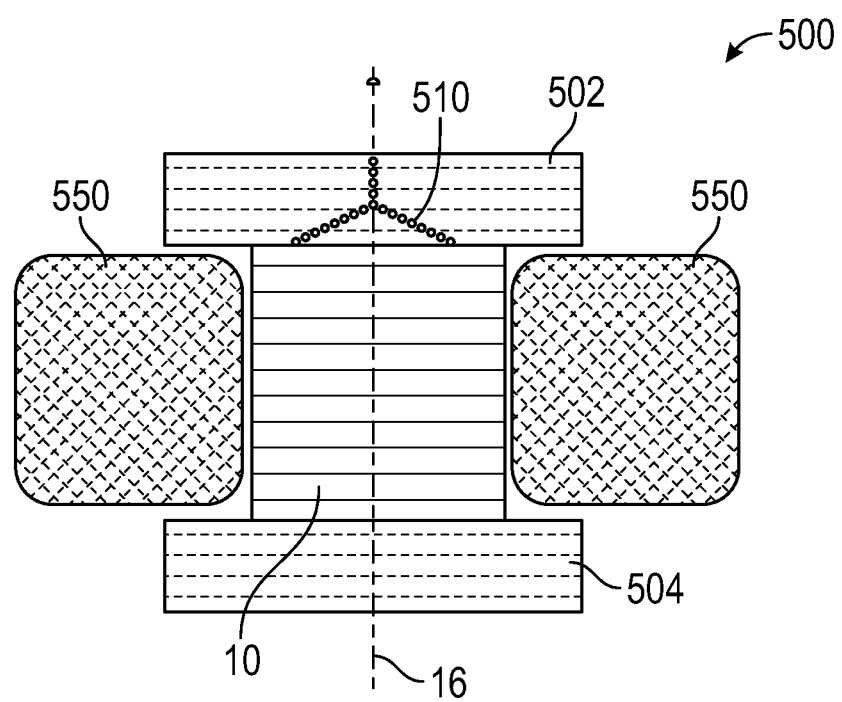
FIG. 10 is an illustration of the rotor core being placed within a mold tool according to an exemplary embodiment of the present disclosure.

A method of assembling the rotor core 10 is now described. FIG. 8 is a process flow diagram illustrating a method 400 for assembling the rotor core 10 and FIG. 9 is an illustration of the magnetic inserts 40 and the insert 42 assembled into the rotor core 10, prior to injecting the load bearing polymer 44. FIG. 10 is an illustration of the rotor core 10 being placed within a mold tool 500, where a plurality of rams 550 that are part of the mold tool exert pressure upon the rotor core 10.

Referring to FIGS. 8 and 9, the method 400 may begin at block 402. In block 402, a temperature differential is created between the rotor core 10 and the insert 42, where the rotor core 10 is cooled and the insert 42 is warmed. Specifically, in one embodiment, a temperature differential of about 100° C. may be created between the rotor core 10 and the insert 42. Cooling the rotor core 10 causes contraction, while heating the insert 42 causes expansion. The method 400 may then proceed to block 404.

In block 404, the insert 42 is then received by the slot 20 of the rotor core 10. Referring to FIG. 9, the temperature differential results in an interference fit between the first distal end 50 and the second distal end 52 of the insert 42 and the slot 20 of the rotor core 10. Furthermore, the temperature differential between the rotor core 10 and the insert 42 results in beneficial stresses in the bridge portions 48 of the rotor core 10. The method 400 may then proceed to block 406.

In block 406, the magnetic inserts 40 are received by the respective magnet slots 18 of the rotor core 10. It is to be appreciated that the magnetic inserts 40 may also be inserted into the rotor core 10 before the insert 42 as well. The method 400 may then proceed to block 408.

In block 408, the rotor core 10 is then placed within the mold tool 500 (seen in FIG. 10). The mold tool 500 may be part of a transfer molding machine or an injection molding machine. The molding tool 500 includes a top plate 502 and a bottom plate 504. As seen in FIG. 10, the central axis 16 of the rotor core 10 is oriented perpendicular with respect to the top plate 502 and the bottom plate 504 of the mold tool 500. The top plate 502 of the mold tool 500 includes runners 510 that allow molten polymer to flow into the clearance features 22 (seen in FIG. 2) of the rotor core 10. The method 400 may then proceed to block 410.

In block 410, a plurality of rams 550 exert a radial pressure against the outer diameter 58 of the rotor core 10. Referring to FIG. 9, the plurality of rams 550 exert a perpendicular pressure P1 on the outer diameter 58 of the rotor core 10 in a direction aligned with each end portion 78 of the first distal end 50 of the insert 42. This is done for each pole 46 of the rotor core 10. An angled pressure P2 is also exerted on the outer diameter 58 of the rotor core 10 in a direction aligned with the middle flux guide 34. The amount of perpendicular pressure P1 and the angular pressure P2 exerted upon the outer diameter 58 of the rotor core 10 depends upon a required pre-load stress S in the bridge portions 48. Specifically, the perpendicular pressure P1 and the angular pressure P2 is exerted upon the rotor core 10 such that the required pre-load stress S in the bridge portions 48 are opposite to the stresses that the bridges experience during operation of the rotor core 10. The method 400 may then proceed to block 412.

In block 412, the load bearing polymer 44 (FIG. 3) is injected into the clearance features 22 within the rotor core 10 as the plurality of rams 550 exert the radial pressure against the outer diameter 58 of the rotor core 10. The method 400 may then proceed to block 414.

In block 414, the plurality of rams 550 stop exerting pressure against the rotor core 10, the load bearing polymer 44 is cured, and the rotor core 10 is removed from the mold tool 500. The method 400 may then terminate.

Referring generally to the figures, the disclosed rotor core and method of assembling the rotor core provide various technical effects and benefits. Specifically, the disclosed rotor core provides clearance between the insert and the lamination plates. Providing clearances between the insert and the rotor core results in low cost manufacturing and assembly. Furthermore, although clearances are disposed between the insert and rotor core during assembly, a load bearing polymer is then injected into the clearances. The load bearing polymer provides contact between the insert and the lamination plates to effectively transmit loads as the rotor core operates.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A rotor core for an electric machine, comprising:
a core stack including a plurality of lamination plates, wherein each lamination plate includes a plurality of apertures formed therein, and wherein the plurality of apertures of each of the lamination plates are axially aligned and each define a plurality of axial magnet slots extending through the core stack shaped to receive a corresponding permanent magnet insert therein and a slot extending through the core stack and shaped to receive a corresponding insert;
at least one insert received by the slot of the rotor core that provides radial structural stability to the plurality of lamination plates to prevent portions of the plurality of lamination plates adjacent the plurality of axial magnet slots from flexing due to radial forces exerted on the plurality of lamination plates during operation of the rotor core, wherein the insert includes a first distal end and a second distal end, and wherein the first distal end of the insert is disposed adjacent to an outer diameter of the core stack and the second distal end of the insert is disposed adjacent to an inner diameter of the core stack, and wherein the second distal end of the insert includes a flange; and
a load bearing polymer disposed within the aperture of the rotor core, wherein the load bearing polymer provides contact between the insert and the lamination plates, wherein a portion of the flange of the second distal end of the insert directly contacts the load bearing polymer.

2. The rotor core of claim 1, wherein the load bearing polymer is one of a thermoplastic polymer and a thermoset polymer.

3. The rotor core of claim 1, wherein a portion of the flange of the first distal end of the insert is in direct contact with the lamination plates of the rotor core.

4. The rotor core of claim 3, wherein the flange of the first distal end of the insert includes a straight surface and two angled surfaces, and wherein only the two angled surfaces of the flange of the first distal end of the insert directly contact the lamination plates of the rotor core.

5. The rotor core of claim 1, wherein a portion of the flange of the first distal end of the insert is in direct contact with the load bearing polymer.

6. The rotor core of claim 1, wherein the flange of the second distal end of the insert has a straight surface and two angled surfaces, and wherein only the two angled surfaces of the flange of the second distal end of the insert directly contact the load bearing polymer.

7. The rotor core of claim 1, wherein the insert includes a pair of outward projecting nubs disposed on opposing sides of the insert in a location directly above a middle flux guide of the rotor core.

8. The rotor core of claim 7, wherein a portion of each of the pair of outward projecting nubs directly contact a portion of the load bearing polymer, and wherein the portion of the load bearing polymer that directly contacts the pair of outward projecting nubs restricts motion of the middle flux guide of the rotor core.

9. The rotor core of claim 1, wherein the insert includes a pair of hooked tabs disposed on opposing sides of the insert.

10. The rotor core of claim 9, wherein each of the pair of hooked tabs of the insert directly contact and engage with a portion of a middle flux guide of the rotor core.

11. The rotor core of claim 1, wherein the insert includes a first pair of hooked tabs and a second pair of hooked tabs disposed on opposing sides of the insert.

12. The rotor core of claim 11, wherein each of the first pair of hooked tabs engage with and directly contact the load bearing polymer, wherein the load bearing polymer is disposed along an end surface defined by an outer flux guide of the rotor core.

13. The rotor core of claim 11, wherein each of the second pair of hooked tabs engage with directly contact the load bearing polymer, and wherein the load bearing polymer is disposed along an outer surface defined by a middle flux guide of the rotor core.

14. The rotor core of claim 1, wherein the rotor core defines an inner flux guide, a middle flux guide, and an outer flux guide.

15. The rotor core of claim 14, wherein the middle flux guide defines a first retention tab that projects inwardly towards the inner flux guide, and the outer flux guide defines a second retention tab that projects outwardly towards the middle flux guide.

16. The rotor core of claim 15, wherein the load bearing polymer is disposed between the first retention tab and a magnetic insert.

17. A rotor core for an electric machine, comprising:
a core stack including a plurality of lamination plates, wherein each lamination plate includes a plurality of apertures formed therein, and wherein the plurality of apertures of each of the lamination plates are axially aligned and each define a plurality of axial magnet slots extending through the core stack shaped to receive a corresponding permanent magnet insert therein and a slot extending through the core stack and shaped to receive a corresponding insert;
at least one insert received by the slot of the rotor core that provides radial structural stability to the plurality of lamination plates to prevent portions of the plurality of lamination plates adjacent the plurality of axial magnet slots from flexing due to radial forces exerted on the plurality of lamination plates during operation of the rotor core, wherein the insert includes a first pair of hooked tabs and a second pair of hooked tabs disposed on opposing sides of the insert; and
a load bearing polymer disposed within the aperture of the rotor core, wherein the load bearing polymer provides contact between the insert and the lamination plates.

18. The rotor core of claim 17, wherein the at least one insert includes a first distal end and a second distal end, wherein the first distal end of the insert is disposed adjacent to an outer diameter of the core stack and the second distal end of the insert is disposed adjacent to an inner diameter of the core stack.

19. The rotor core of claim 18, wherein a portion of the second distal end of the insert directly contacts the load bearing polymer.

20. A rotor core for an electric machine, comprising:
a core stack including a plurality of lamination plates, wherein each lamination plate includes a plurality of apertures formed therein, and wherein the plurality of apertures of each of the lamination plates are axially aligned and each define a plurality of axial magnet slots extending through the core stack shaped to receive a corresponding permanent magnet insert therein and a slot extending through the core stack and shaped to receive a corresponding insert, and wherein the rotor core defines an inner flux guide, a middle flux guide, and an outer flux guide, and wherein the middle flux guide defines a first retention tab that projects inwardly towards the inner flux guide, and the outer flux guide defines a second retention tab that projects outwardly towards the middle flux guide;
at least one insert received by the slot of the rotor core that provides radial structural stability to the plurality of lamination plates to prevent portions of the plurality of lamination plates adjacent the plurality of axial magnet slots from flexing due to radial forces exerted on the plurality of lamination plates during operation of the rotor core; and
a load bearing polymer disposed within the aperture of the rotor core, wherein the load bearing polymer provides contact between the insert and the lamination plates.

* * * * *